No. 757,752. Patented April 19, 1904.

UNITED STATES PATENT OFFICE.

FRANK W. KILLEN, OF WILMERDING, PENNSYLVANIA.

HOSE-COUPLING.

SPECIFICATION forming part of Letters Patent No. 757,752, dated April 19, 1904.

Application filed May 1, 1903. Serial No. 155,175. (No model.)

*To all whom it may concern:*

Be it known that I, FRANK W. KILLEN, a citizen of the United States, residing at Wilmerding, in the county of Allegheny, State of Pennsylvania, have invented certain new and useful Improvements in Hose-Couplings; and I do hereby declare the following to be a full, clear, and exact description of the invention, such as will enable others skilled in the art to which it appertains to make and use the same.

This invention relates to hose-couplings; and it has for its object to provide a construction wherein by operation of the levers mounted upon one of the members the clutch-hooks, which are designed to engage the opposite member, will be moved toward each other and rearwardly of the first-named member, so as to draw the second member thereinto, and by operations of the levers in a reverse direction the clutch-hooks will be moved forwardly and outwardly.

A further object of the invention is to provide a coupling which will hold the parts securely and which may be easily engaged and disengaged.

Figure 1:
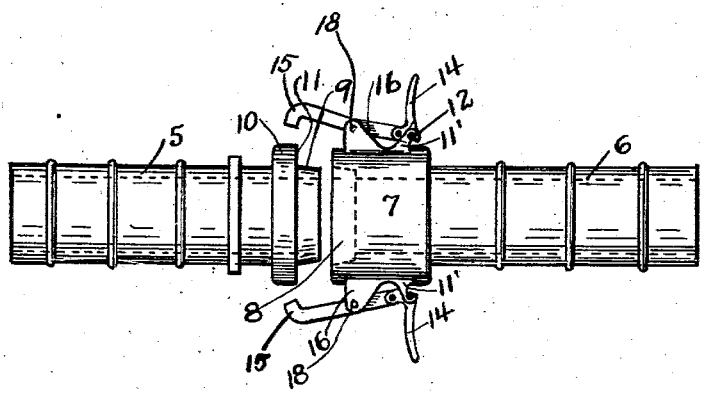
Figure 2:
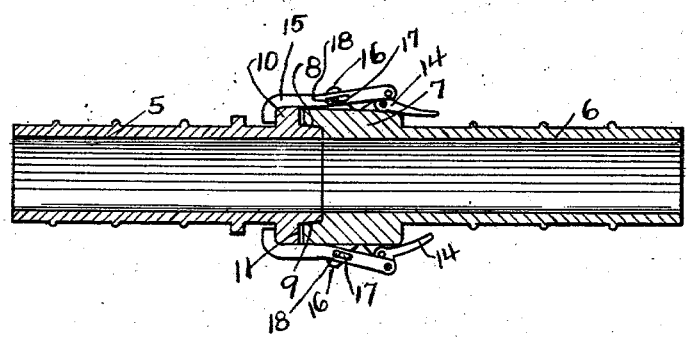
Figure 3:
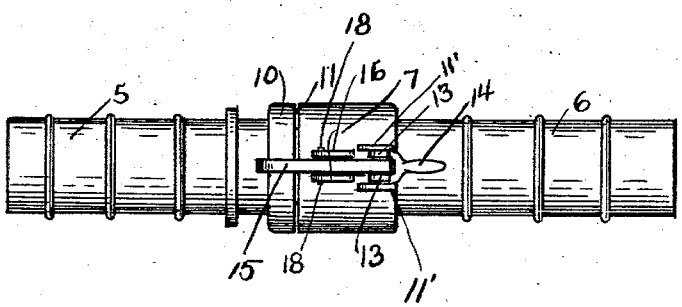

In the drawings forming a portion of this specification, and in which like numerals of reference indicate similar parts in the several views, Figure 1 is a side elevation showing a coupling embodying the present invention. Fig. 2 is a section taken longitudinally of the coupling in the plane of the clutch-hooks with the latter in their operative positions. Fig. 3 is a top plan view of the coupling with the parts engaged.

Referring now to the drawings, there is shown a coupling comprising the tubular members 5 and 6, which are adapted for attachment of sections of hose thereto, the members in the present instance being adapted to be inserted in the ends of sections of hose, which are clamped or bound thereon.

The tubular member 6 has an enlarged cylindrical head 7, in which is formed a socket 8 at its free end by countersinking the bore of the head, this countersink or socket being designed to receive the free end portion 9 of the member 5. The countersink 8 and the portion 9 may be correspondingly tapered, so that the portion 9 may be forced into the countersink or socket and a snug fit insured. At the rear of the portion 9 is a circumscribing flange 10 upon the member 5, having a flat front face 11, and, if desired, a washer may be placed upon the portion 9, so that it will be clamped between the face of the flange and the face of the head 7 to insure against leakage of any fluid that may find its way between the faces of the mutually-engaging portions of the members 5 and 6.

Upon the head 7, at the rear end thereof and at diametrically opposite points, are pairs of spaced ears 11' in the form of rearwardly-directed hooks, with which are removably engaged the outwardly-turned ends 12 of the arms 13 of a bifurcated lever 14, and pivoted to the arms 13 in the rear of the outwardly-turned ends 12 is a clutch-hook 15. The clutch-hooks 15 at opposite sides of the head 7 extend beyond the free end of the head 7, and their extremities or bills are turned toward each other and are so positioned that when the clutch-hooks are moved to lie upon the face of the head 7 these inturned ends or bills of the hooks will lie beyond the end face of the head a sufficient distance to receive the flange 10 between them and the end of the head.

The proportions of the parts are such that when the hand-levers 14 are swung forwardly the bills of the hooks will be moved to release the flange 10 and when the levers are swung rearwardly, so as to bring the pivotal connections of the hooks beyond the centers of the outturned ends 12 of the arms of the levers, the bills of the hooks will lie in sufficiently close relation to the end face of the head 7 to clamp the flange 10 closely against the end face.

When the clutch-hooks are shifted to their disengaging positions, it is also desirable that the free ends of said hooks or their bill portion be moved outwardly or away from each other beyond the periphery of the flange 10, so that the member 5 may be readily withdrawn from the member 6. For this purpose spaced ears 16 are formed upon the head 7 at diametrically opposite points thereof and in such positions that each of the clutch-hooks is received between a pair of these ears. In the ears 16 are formed perforations which receive transverse pins 18, which engage through the slots 17 of the clutch-hooks.

In the operation of the coupling mechanism when the levers 14 are drawn rearwardly into the positions shown in Fig. 2 of the drawings the clutch-hooks are drawn rearwardly, and as the clutch-hooks move with respect to the pins 18 the latter in effect travel through the slots 17 of the clutch-hooks and cause said hooks to move inwardly and over the shoulder 10. As the work ends of the levers 14 move rearwardly they move outwardly, swinging the clutch-hooks toward each other over the shoulder or flange 10. This movement of the levers 14 is continued after the clutch-hooks are in engaging positions, so that the pivotal connection between each lever and its clutch-hook is swung beyond a line connecting the fulcrums of the two levers 14. As the pivotal connections cross the line the connected ends of the hooks are sprung outwardly, and after the pivotal connections pass the line the resiliency of the stems of the hooks cause them to spring inwardly. To return the levers, the connected ends of the clutch-hooks must be sprung outwardly, and it is the resistance to this outward springing movement that prevents accidental disengagement of the clutch-hooks. Thus to connect the members of the coupling the part 9 is entered in the socket 8, and the levers 14 are moved rearwardly, so as to draw the hooks with their bills toward each other and rearwardly of the head, so as to engage the flange 10 and draw the member 9 into the socket 8. When the levers are reversely operated, the bills of the clutch-hook are moved forwardly and outwardly to disengage the flange and permit withdrawal of the member 9 from the socket 8.

It will be understood that in practice modifications of the specific construction shown may be made and that any suitable materials and proportions may be used for the various parts without departing from the spirit of the invention.

What is claimed is—

1. A hose-coupling comprising a member having a socket, a second member adapted to engage the socket and having a flange in the rear of its engaging portion, levers pivoted to the first-named member, clutch-hooks pivoted to the levers and designed to engage behind the flange of the second member, said hooks having slots formed diagonally of their stems, ears upon the socketed member between which the stems of the hooks are slidably received, and pins engaged with the ears and lying loosely in the slots of the stems of the hook.

2. A hose-coupling comprising a member having a socket, a second member adapted to engage the socket and having a flange in the rear of its engaging portion, hooks disposed in pairs upon the socketed member, bifurcated levers having outwardly-directed ends removably engaged in said hooks, ears upon the socketed member arranged in pairs, clutch-hooks pivoted between the arms of each bifurcated lever and slidably engaged between the corresponding ears and adapted to engage over the flange of the second member, the stems of said hooks having diagonal slots therein, and pins engaged with each pair of ears and lying loosely in the slot of the stem therebetween.

In testimony whereof I affix my signature in presence of two witnesses.

FRANK W. KILLEN.

Witnesses:
ALLAN GRAHAM,
JOHN KILLIAN.